United States Patent [19]

Handly et al.

[11] 4,084,233
[45] Apr. 11, 1978

[54] MICROCOMPUTER APPARATUS

[75] Inventors: Robert J. Handly; Robert H. Douglas, both of Phoenix, Ariz.

[73] Assignee: Honeywell, Inc., Minneapolis, Minn.

[21] Appl. No.: 689,822

[22] Filed: May 25, 1976

[51] Int. Cl.² .................. G06F 9/00; H03K 3/26; H03K 19/20; H03K 5/13
[52] U.S. Cl. .................. 364/200; 331/108 D; 307/208
[58] Field of Search ............ 340/172.5; 307/208; 331/108 D; 364/200, 900

[56] References Cited

U.S. PATENT DOCUMENTS

| 3,736,567 | 5/1973 | Lotan et al. | 340/172.5 |
| 3,740,722 | 6/1973 | Greenberg et al. | 340/172.5 |
| 3,914,711 | 10/1975 | Carlson et al. | 331/108 D |

Primary Examiner—Raulfe B. Zache
Attorney, Agent, or Firm—L. J. Marhoefer; L. D. Burton

[57] ABSTRACT

A computer system features a processor unit which includes its own microprogram control unit. The microprogram control unit includes a storage means for operational instructions for the processor unit and means to issue those instructions in a desired sequence. A communication Bus provides communication channels between the processor unit and either data storage means or other processor units served by the Bus. The processor unit includes a number of clock controlled functional components as well as means for requesting access to the Bus. A clock signal generating means is controlled by signals from the microprogram control unit. When a request has been made for access to the Bus, the processor continues to operate until a point is reached when access to the Bus must be accomplished before continuing. The microprogram control unit issues a control signal which effectively stops the operation of the clock signal generating means until the Bus access routine has been accomplished. The clock signal generating means resumes operation when the access routine has been completed.

7 Claims, 1 Drawing Figure

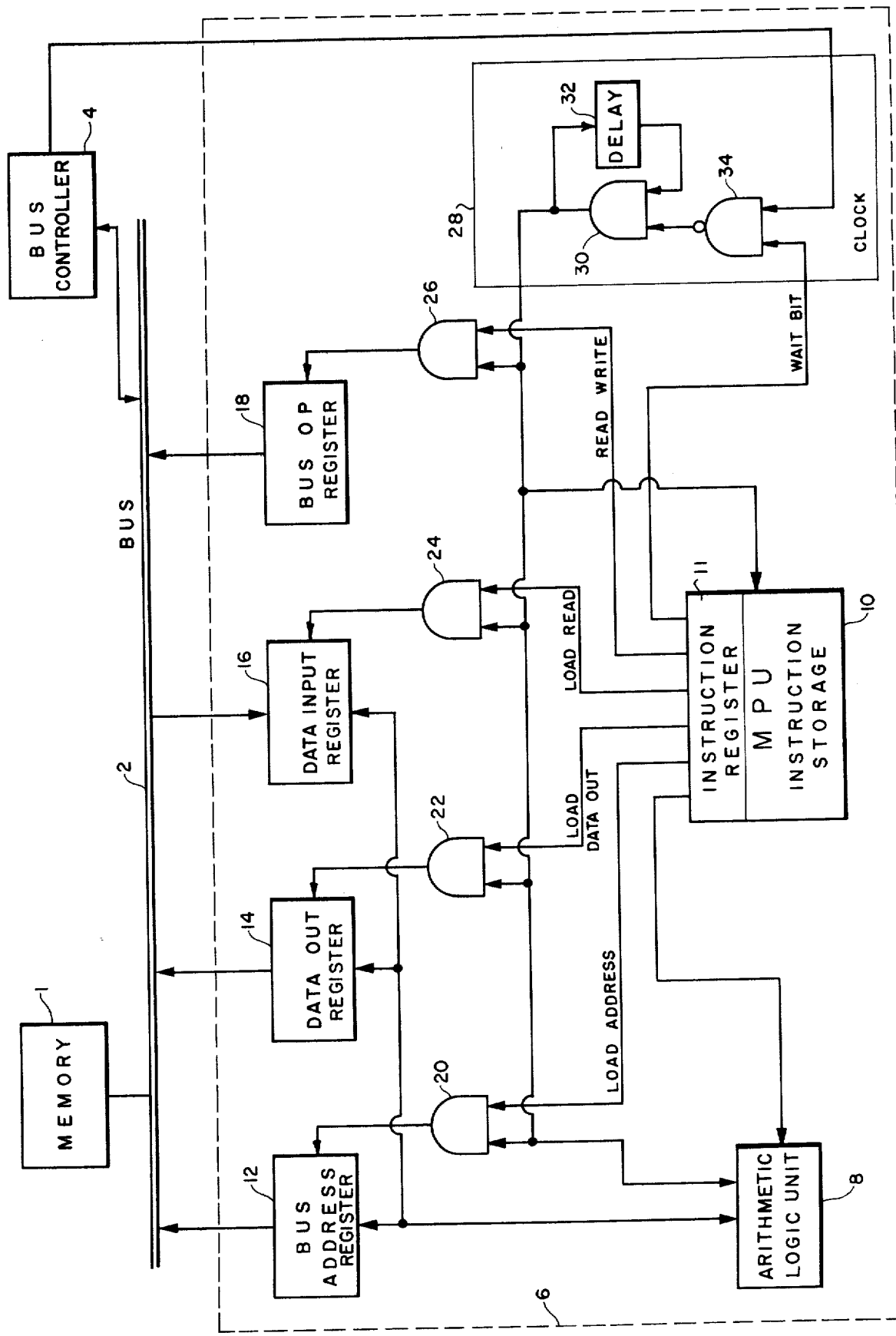

MICROCOMPUTER APPARATUS

BACKGROUND OF THE INVENTION

1. Field of the Invention

The present invention relates to a microprogrammed computer apparatus, and more particularly to a synchronizing scheme for such a computer.

2. Discussion of the Prior Art

In the field of the computer technology, there has evolved a system of hierarchical or distributed computer operation. In such a system there is provided a main memory or storage unit or units and a plurality of processor units. The processor units communicate with the storage units and possibly with other processor units by way of a communication Bus. The processor units perform operations such as instruction decoding, computational activity, and interfacing with input/output instrumentalities.

It is essential, however, for such processors to effectively communicate by way of the Bus. Heretofore, whenever such communication was necessary, the processor unit issued a request for access to be granted before any further action occurred. Such waiting has proven to be time consuming to the extent of significantly slowing the overall processing of data.

SUMMARY OF THE INVENTION

It is, accordingly, an object of the present invention to provide an improved processor unit for a computer system, which avoids the aforementioned shortcomings of the prior art.

It is another object of the present invention to provide means for synchronizing on demand a processor unit with the operation of a communication Bus.

It is a further object of the present invention to provide an improved control means for a processor unit.

In accomplishing these, and other objects, there has been provided, in accordance with the present invention, in a computer system a processor unit which includes its own microprogram control unit. The microprogram control unit includes a storage means for operational instructions for the processor unit and means to issue the instructions in a desired sequence. The processor unit includes a number of clock controlled functional elements as well as means for requesting access to the Bus. A clock signal generating means is controlled by signals from the microprogram control unit.

When a request has been made for access to the Bus, the processor continues to operate until a point is reached when the access to the Bus must be accomplished before continuing. The microprogram control unit issues a control signal which effectively stops the operation of the clock signal generating means until the Bus access routine has been accomplished. The generation of clock signals will resume when the access operation has been accomplished.

BRIEF DESCRIPTION OF THE DRAWINGS

A better understanding of the present invention may be had from the following detailed description when read in the light of the accompanying drawings, in which.

The single FIGURE is a schematic block and logic diagram of structure embodying the present invention.

DETAILED DESCRIPTION

Referring, now, to the drawing in more detail, there are shown elements of a computer featuring a Processing Unit 6. A communication Bus 2 provides a communication channel between a Bus Controller 4, and a Data Storage Unit or module 1, and any of several Processing Units 6 which may be served by the Bus 2. The Processing Unit 6 may, for example, be an instruction execution unit which, in turn includes a functional Arithmetic Logic Unit (ALU) 8 and a Microprogram Unit (MPU) 10 which is a firmware control center for the Processing Unit 6. The MPU 10 includes a Control Memory unit 11 in which is stored a set of microinstructions for controlling the operation of the Processing Unit 6, and an instruction register 13 for issuing the instructions to the components of the Processing Unit 6.

A plurality of functional units or operational registers, such as a Bus Address register 12, a Data Output register 14, a Data Input register 16, and a Bus Operate register 18 are included in the Processing Unit 6. Each of those registers are connected through suitable gating (not shown) to the Bus 2. Through suitable interconnection, the several resigers 12, 14 and 16 are operationally coupled to the ALU 8. Each of the registers 12, 14, 16 and 18 is operated under control of the instructions issued by the MPU 10 through suitable gating means. For example, a "load address" instruction from the MPU is applied through an AND gate 20 to control the operation of the Bus Address register 12. A "load data out" instruction from the MPU 10 is applied through an AND gate 22 to control the operation of the Data Output register 14. Similarly, the Data Input register 16 is controlled by a "load-read" instruction from the MPU 10 applied through an AND gate 24. The Bus Operate register 18 is controlled by a "read-write" instruction from the MPU 10 applied thereto through an AND gate 26. Each of the gates 20, 22, 24 and 26, are enabled by "clock" signals from a clock circuit 28. Thus the registers are loaded only on the transition of the clock signal.

The clock circuit 28 includes a controllable solid state oscillator comprising an AND gate 30, a feedback delay means 32, and a control NAND gate 34. The NAND gate 34 has one input terminal connected to the MPU 10 which issues a "Wait" signal, when Bus synchronization is desired. The other terminal of the NAND gate 34 is connected to an output from the Bus Controller 4.

OPERATION

It will be appreciated that a Processing Unit such as Unit 6 can operate internally at a much higher speed than can the Bus/Memory. As previously mentioned, in the prior art structures, the processing units were dependent from the Bus Controller and were, accordingly, limited by the Bus Controller/Memory when accessing them. In the present structure, the local MPU 10 provides intelligent control of the Bus synchronization at the local level, allowing the Processing Unit 6 to operate at its own speed, asynchronously with respect to the Bus 2 until synchronization is required. Since there must be reference to the Bus 2 for some functions, a part of the instruction issued by the MPU 10 as, for example, by way of the Bus Operate register 18, includes a request for access to a Data Storage Module 1 or other Processing Unit 6 by way of the Bus 2. As noted, in the previous systems, when such a request for access to the Bus is made by the processing unit, all action at the processing unit stops, awaiting such access and the completion of the access routine. In the present system, with the local control exercised by the MPU 10, the request for access to the Bus may be issued early in the procedure of a routine, while the Processing Unit 6 continues with all of the functions of which it is capable. Then, when the access to the Bus is essential to further processing, the activity in the Processing Unit is stopped until the access to the Bus has been accomplished.

To that end, the several functions of the Processing Unit 6 are clocked by signals from the clock circuit 28. The clock circuit 28, with the gate 30 and the feedback delay 32 comprises an interruptible, free running, oscillator operating at a predetermined clock rate. Included with the instructions from the MPU 10 is a "wait" signal bit which is applied to one of the input terminals of the control NAND gate 34, before the MPU 10 advances to the next instruction. If a request for access to the Memory or Storage Module 1 had been issued and which request had not yet been serviced, the Bus Controller 4 will issue a "Bus busy" signal which is applied to the other input terminal of the NAND gate 34. The coincidence of the two signals at the input of the NAND gate 34 causes the output thereof to go to a logical "low", stopping the operation of the clock circuit 28. With the stopping of the operation of the clock circuit 28, no "clock" signals are applied to the several operational elements of the Processing Unit 6. Accordingly, the further operation of those clocked elements are stopped until the Bus access has been accomplished.

If, in the course of performing the previous instruction from the MPU 10, a second request for access to the Storage Unit 1 through the Bus was required, that second request would, of course, be held up until the completion of the first request. With the clock stopped and the Processing Unit 6 in the WAIT mode, the completion of the first request restarts the clock 28. The restarting of the clock will, in turn, immediately effect the issuance of the second request. Meanwhile, the Processing Unit 6 continues with its internal processing of data until it again comes to the point where no further processing can be performed without the requested access. Again, the clock is stopped, as before, until the access is completed.

On the other hand, if when the "wait" signal had been issued by the MPU 10, either no access request had been made or, if made, had already been completed, the "wait" signal would not stop the clock 28 and the processing in the Processing Unit 6 would continue uninterrupted to and into the next instruction from the MPU 10.

Thus it may be seen that there has been provided, in accordance with the present invention, an improved computer unit wherein the Processing Unit includes within itself a store of instructions which allows the Processing Unit to operate asynchronously with respect to an associated memory. The Processing Unit also includes controlled timing means for establishing synchronous coordination with the Bus Controller when such coordination is required.

The embodiments of the invention in which an exclusive property or privilege is claimed are defined as follows:

1. In a computer system, a processing unit including,
   a plurality of functional components,
   a microprogram control unit,
   said microprogram control unit including storage means for storing operational instructions for said processing unit and means to issue said operational instructions in a desired sequence, said plurality of functional components being controlled by said microprogram control unit,
   clock means for clocking the operation of said components and said microprogram control unit, and
   means responsive to a first and a second control signal for interrupting the operation of said clock means.

2. In a computer system,
   a processing unit,
   a data storage unit,
   a communication Bus for selectively providing communication channels between said processing unit and said storage unit,
   a Bus controller for controlling access to said Bus by said processing unit,
   said processing unit including a plurality of functional components and a microprogram control unit,
   said microprogram control unit including storage means for storing operational control instructions for said processing unit and means to issue said operational instructions in a desired sequence, said plurality of functional components being controlled by said microprogram control unit,
   said processing unit further including a clock means for clocking the operation of said functional components and said microprogram control unit, and
   means responsive to the coincidence of a first control signal from said microprogram control unit and a second control signal from said Bus controller to interrupt the operation of said clock means.

3. In a computer system,
   a processing unit,
   a storage unit,
   a communication Bus for selectively providing communication channels between said processing unit and said storage unit,
   a Bus controller for controlling access to said Bus by said processing unit,
   said processing unit including a plurality of functional components and a microprogram control unit,
   said microprogram control unit including storage means for storing operational control instructions for said processing unit and means to issue said operational instructions in a desired sequence, said plurality of functional components being controlled by said microprogram control unit,
   said processing unit further including a clock means for clocking the operation of said functional components and said microprogram control unit, said clock circuit comprising an interruptible, free-running solid state oscillator, and
   means responsive to the coincidence of a first control signal from said microprogram control unit and a second control signal from said Bus controller to interrupt the operation of said clock means.

4. The computer system as set forth in claim 3 wherein said clock means comprises a first solid-state gate means having two input terminals and an output terminal, a signal delay means connected between said output terminal and one of said input terminals, an enabling circuit comprising a second solid-state gate means having an output terminal connected to the other input terminal of said first gate means, said second gate means having a first input terminal connected to receive said first control signal from said microprogram control unit and a second input terminal connected to receive said second control signal from said Bus controller.

5. In a computer system,
a processing unit,
a storage unit,
a communication Bus for selectively providing communication channels between processing units and said storage unit,
a Bus controller for controlling access to said Bus by said storage unit,
said processing unit including a plurality of functional components and a microprogram control unit,
said microprogram control unit including storage means for storing operational control instructions for said processing unit and means to issue said operational instructions in a desired sequence, said plurality of functional components being controlled by said microprogram control unit,
said processing unit further including a clock circuit for clocking the operation of said functional components and said microprogram control unit, said clock circuit comprising an interruptible, free-running solid state oscillator, and
means responsive to the coincidence of a first control signal from said microprogram control unit comprising a WAIT signal effective before the completion of each instruction and a second control signal from said Bus controller indicative that a require access to the Bus has not been completed, said coincidence of said first and second control signal being effective to interrupt the operation of said clock circuit until said required Bus access has been completed.

6. In a computer system,
a plurality of processing units,
at least one data storage unit,
a communication Bus for selectively providing communication channels between said processing units and said storage unit and between processing units,
a Bus controller for controlling access to said Bus by said processing units,
at least one of said processing units including a plurality of functional components and a microprogram control unit,
said microprogram control unit including storage means for storing operational instructions for said processing unit and means to issue said operational instructions in a desired sequence, said plurality of functional components being controlled by said microprogram control unit,
said at least one of said processing units further including a clock means for clocking the operation of said functional components and said microprogram control unit, and
means responsive to the coincidence of a first control signal from said microprogram control unit and a second control signal from said Bus controller to interrupt the operation of said clock means.

7. A clock circuit for a computational unit,
said clock circuit comprising an interruptible, free-running solid-state oscillator and including,
a first solid-state gate means having two input terminals and an output terminal,
a signal delay means connected between said output terminal and one of said input terminals,
an enabling circuit comprising a second solid-state gate means having two input terminals and an output terminal, the output terminal of said second gate means being connected to the second one of the two terminals of said first gate means, said two input terminals of said second gate means being arranged to receive a first and a second control signal, respectively, coincidence of which is effective to disable said clock circuit.

* * * * *